Sept. 6, 1938.   C. G. RICHARDSON   2,129,236
CLOTH SHEARING MACHINE
Filed June 29, 1936   2 Sheets-Sheet 1
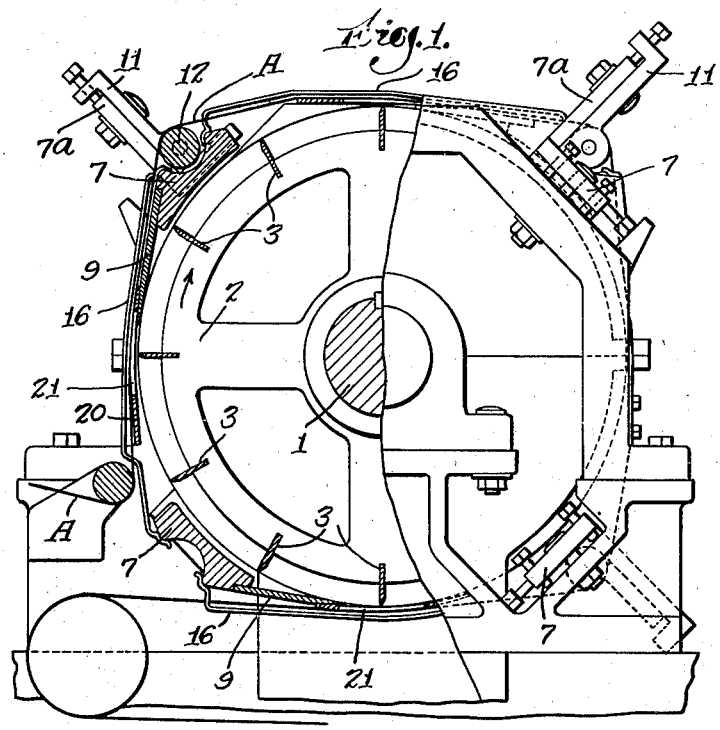
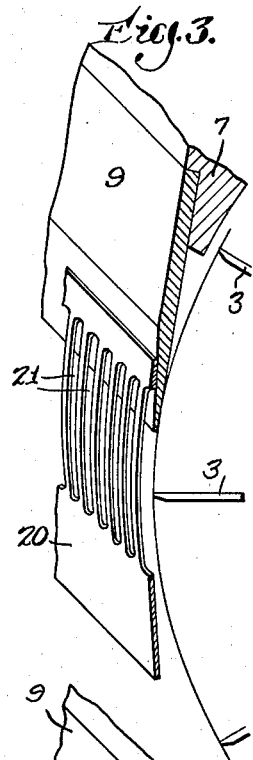
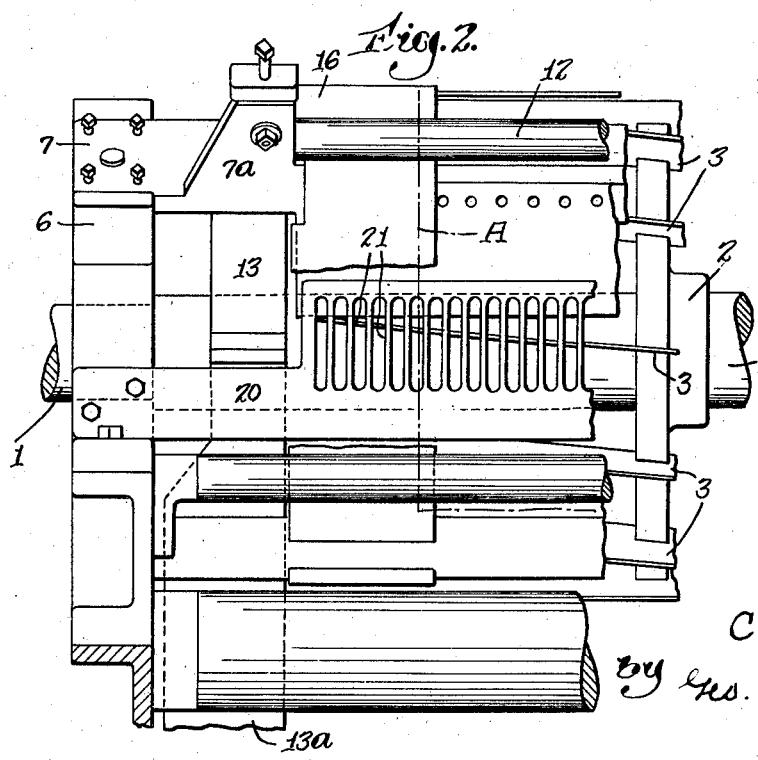
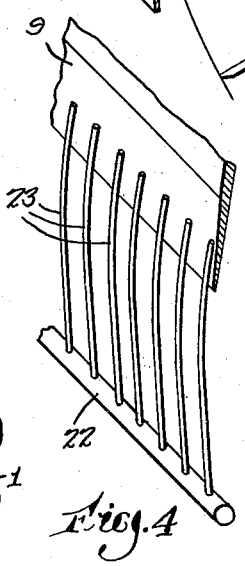
Inventor
C. G. Richardson
by Geo. N. Goddard,
Attorney Sept. 6, 1938. C. G. RICHARDSON 2,129,236
CLOTH SHEARING MACHINE
Filed June 29, 1936 2 Sheets-Sheet 2
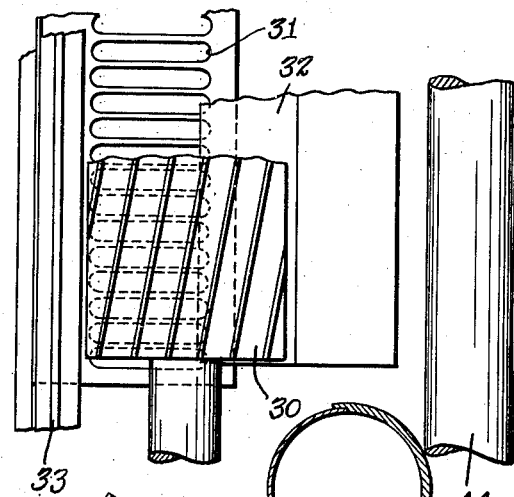
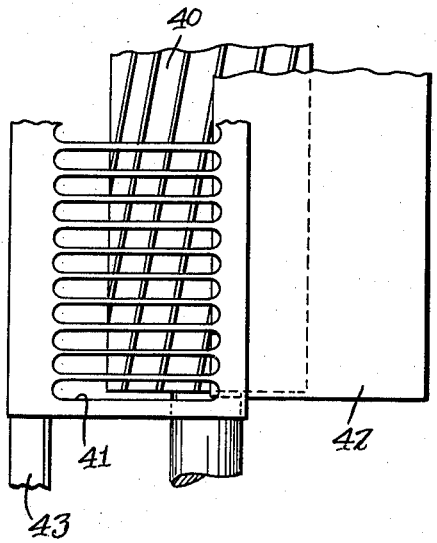
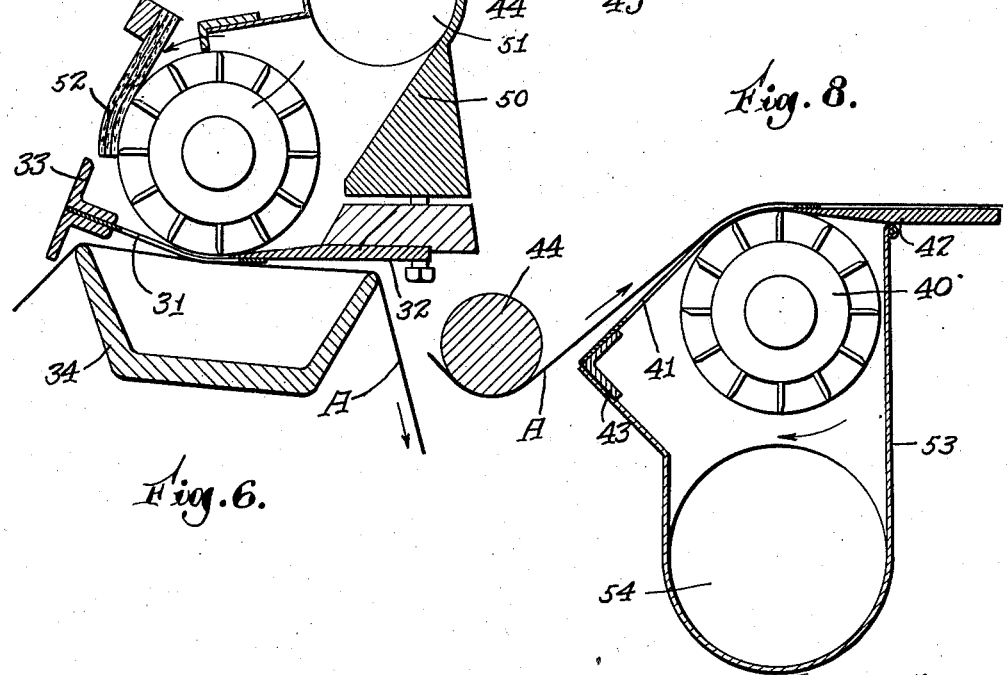
Inventor
C. G. Richardson
by Geo. N. Goddard,
Attorney Patented Sept. 6, 1938

2,129,236

UNITED STATES PATENT OFFICE 2,129,236

CLOTH SHEARING MACHINE

Charles G. Richardson, Springfield, Vt., assignor to Parks & Woolson Machine Company, Springfield, Vt., a corporation of Vermont Application June 29, 1936, Serial No. 87,981

8 Claims. (Cl. 26—15)

This invention relates to cloth shearing machines and particularly that type of machine employed for clipping or cropping the threads on the face of the cloth being finished and is intended to provide a thoroughly safe and dependable means for protecting the cloth sewings or seams where the adjacent ends of two pieces of cloth are sewed together to prevent injury to the cloth as it passes by the shearing line formed by the revoluble cutter and the stationary blade which coacts therewith.

Heretofore such face shearing or clipping machines have been provided with seam-controlled means whereby a mechanism energized by the seam approaching the shearing line has caused sufficient separation of the cutting or shearing members and the cloth supporting means to prevent cutting the cloth or injury to the cutting blades when the seam passes the shearing line. This has involved comparatively expensive mechanism and in many cases leads to the skipping of the shearing of the surface threads for a substantial distance on either side of the transverse sewing or seam.

The present invention eliminates the opening apart or separation of the shearing blades and the cloth support and allows the safe use of a higher speed of cloth travel through the machine, thus materially reducing the expense of this type of cloth finishing.

Generally speaking, the invention comprises, in conjunction with a revolving cutter and its associated stationary blade, a seam protecting guide provided with longitudinal slots or interspaces extending in the direction of travel of the cloth and arranged to form an open bridge across the shearing line interposed between the cutters and that portion of the cloth that is passing the shearing line, the openings or interspaces permitting the exposure of the threads to the shearing edges, while rendering it impossible for wrinkles or extra thicknesses or sewings in the cloth being severed in the normal operation of the machine. Indeed, the device is capable of being so used in association with the shearing cutters that the usual cloth rest may be entirely omitted. These and other features of this invention will be described in the following specification and will be defined in the claims hereto annexed.

In the drawings I have illustrated several forms of utilizing the principle of this invention, in which Fig. 1 is an elevation, partly in section, showing the seam protecting guide applied to a hollow skeleton fly blade or revolver with which is associated a plurality of ledger blades and an interior exhaust.

Fig. 2 is a front elevation showing one end of the shearing mechanism provided with the present improvement.

Fig. 3 is an enlarged detail view showing in perspective the construction and arrangement of one form of cloth protecting grid.

Fig. 4 is a similar view showing a modified form of protecting grid.

Fig. 5 is a detail plan view showing the arrangement of the protective grid in that type of shearing machine in which the cloth is supported by what is known as a gap cloth rest.

Fig. 6 is an end elevation, partly in section, of the arrangement shown in Fig. 5.

Fig. 7 is a plan view showing an arrangement of the protective grid with relation to the shearing cutters that dispenses with any cloth rest in opposition to the shearing line.

Fig. 8 is an elevation, partly in section, of the arrangement shown in Fig. 7.

In practice, the protective grid which forms the essential feature of the invention may be applied to various types of shearing or cropping machines and in Fig. 1 and Fig. 2 it is shown applied to a type of shearing machine which comprises a hollow or skeleton fly blade provided with means for exhausting or drawing the air inwardly between the cutter blades, so that the threads on the face of the cloth toward the cutter are drawn inwardly across the shearing line formed by the peripheral blades of the revolver and the associated, approximately tangential ledger blades. As this construction of shear forms the subject of my copending application, Serial No. 63,489, it need not be described in complete detail herein but only for the purpose of illustrating the application of my improved protective grid to this type of machine.

As shown in Fig. 1 and Fig. 2, the fly blade shaft 1 is revolubly supported in stationary end heads 6 at opposite ends thereof and the fly blade comprises a series of heads or spiders 2 secured to the central shaft 1 and carrying around their periphery a series of concentrically arranged circumferentially spaced cutter blades 3, usually of inclined or helical form. At spaced intervals around the periphery of this skeleton fly blade are mounted longitudinal beams 7, to which the ledger blades are secured and which form a firm support therefor capable of adjustment by means of appropriate adjusting screws at each end of the beam, which adjustably secure the beam to the adjacent end head 6, which, as shown, is of polygonal form. At each end the beam 7 is provided with an upstanding flange 7a to which is adjustably secured a bearing bracket 11, which carries a guide roller 12 for guiding the cloth whose course is shown at A around the outside of the revolving fly blade in approximately tangential stretches.

Over each end of the skeleton fly blade there is provided an exhaust casing 13 communicating with an exhaust pipe 13a so as to produce, when the machine is in operation, a constant inflow of air through the cloth itself toward the interior of the fly blade. Since the cloth itself forms in effect an exterior casing surrounding the rotary fly blade and since the cloth varies in width, removable guard plates 16 enclose the circumferential gap at the ends of the fly blade beyond the edge of the cloth and these plates of appropriate width serve to prevent the weakening of the exhaust since they overlap the edges of the travelling cloth and therefore aid the cloth in producing a partial vacuum inside the skeleton fly blade.

The seam protecting guides may be constructed in various ways. In the form shown in Fig. 3 they are formed of longitudinal strips or sheets of thin sheet metal provided with a series of closely arranged longitudinal slots or openings extending in the direction of the travel of the cloth. In this case, the slots do not extend to either the forward or the rear edge but leave intact forward and rear selvage portions as a support for the narrow spaced ribs separating the slots and forming the grid.

As shown in Fig. 2, the ends of the lower or forward selvage, speaking with relation to the travel of the cloth, are extended for attachment to the end heads that support the fly blade shaft and the grid portion is preferably slightly bowed or curved to follow the curvature of the path of revolution of the fly blade cutters, so that this open gridwork bridges across the shearing line, while the rear selvage overlaps and rests upon the forwardly projecting edge portion of the ledger blade 9. The grid can be made of sufficient thinness to allow the surface threads on the cloth to be drawn inward between the ribs of the grid directly into the shearing line formed by the forward edge of the ledger blade and the revolving blades of the fly blade.

In Fig. 4 is shown another form of construction for the protective grid, which comprises a bar 22 adapted to be mounted in parallelism with the axis of the fly blade and having a series of parallel wires 23 spaced apart and having their rear ends resting upon the ledger blade.

It will be seen that this protective grid bridges over the forward edge of the ledger blade and prevents the cloth or the sewings, where two pieces of cloth are joined together, from getting caught in the shearing line formed by the two shearing members while permitting the surface threads on the inside face of the cloth to be drawn by the air exhaust inwardly between the members of the grid directly across the line of shearing.

While I have shown this invention in Fig. 1 and Fig. 2 as applied to a fly blade equipped with multiple ledger blades, it is clear that the invention can also be applied to the ordinary solid type of fly blade cutter, as illustrated in Fig. 5 and Fig. 6. In that case the solid fly blade 30 has associated with it in a suitable supporting head, not shown, a ledger blade 32, while the cloth travels by the shearing line supported by any appropriate type of gap cloth rest 34, the spaced supporting portions of which are located at a sufficient distance from the shearing line to prevent clamping or binding the interposed portion of the cloth as it travels by the shearing line. In this application of the invention the protective grid 31 is secured to a supporting angle bar 33 in such manner that its rear end rests against the outer face of the ledger blade 32 which it overlaps, so that the cloth A travelling over the cloth rest presents its surface threads or pile to the shearing line through the interspaces of the grid, while the sewings are kept from contact with the shearing line.

In Fig. 7 and Fig. 8 is illustrated an arrangement in which the cloth rest, as a separate and distinct element, is eliminated entirely and the protective grid 41 secured at its forward end to the transverse angle bar 43 passes over and around the periphery of the fly blade 40 and has its rear edge resting upon the ledger blade 42 near the forward or cutting edge thereof. A guide roller 44 arranged in advance of the cutters guides the cloth at a small inclination to the grid.

As there is no separating action required for dropping the cloth rest or lifting the shearing head away from the cloth rest to allow the seam to pass through, the machines can be operated as safely at much higher speeds than is the practice today in face shearing or cropping machines. The mechanism is so simple and inexpensive that there is no danger of its getting out of order and the machine performs its work with the maximum of economy and safety while permitting as close shearing or clipping as practical service requires.

In the form of the invention as applied in Fig. 1 and Fig. 2, the cloth itself passing around the exterior of the cutting members and of the protective grids creates a partial vacuum chamber, as above explained, whereby the surface threads are sucked through the grid openings as they approach the shearing line.

In the other forms of the invention illustrated in Fig. 6 and Fig. 8 there is provided an exhaust chamber around the fly blade formed by the transverse beam 50, the ledger blade 32, the grid support 33 and the oiling swab 52 in communication with the exhaust or outlet opening 51, at either end of the machine, whereby the air is sucked through the cloth passing over the gap rest so as to draw a strong current of air through that portion of the cloth subtending the grid causing the surface threads to be drawn inwardly across the shearing line.

In the form shown in Fig. 8 the same principle is employed by use of a casing 53 extending from the grid supporting beam 43 around to the ledger blade 42 and provided at its ends with the outlet or exhaust pipe 54. In all cases the threads are drawn by air suction inwardly through the openings in the grid, thus insuring the complete and close severing of the surface threads by the coacting shearing cutters.

What I claim is:

1. A seam protecting device for a cloth shearing machine comprising a protective grid having a series of relatively narrow parallel strips arranged to extend in the direction of travel of the cloth and separated by intervening longitudinal spaces of relatively greater width permitting projecting threads on the cloth to freely travel through the spaces as the threads approach the shearing line, said grid being curved to approximately conform to the curvature of the path of the cutter blades of the shear and overlapping the shearing line.

2. A seam protecting device for a cloth shearing machine, of the type having a revolving cutter coacting with a stationary cutter blade, comprising an open grid having longitudinal guide members separated by relatively wide longitudinal spaces and conforming to approximately the curvature of the peripheral path of the fly blade for a distance in front of the stationary blade, whereby the cloth passing over said grid is protected from being cut while the threads projecting from its face are free to travel along said spaces to the shearing line formed by the cutters.

3. In a machine for clipping loose threads on the face of a web of cloth, the combination with a shearing couple comprising a revoluble fly blade and associated ledger blade, of spaced means for guiding a stretch of the cloth to the shear line of the fly and ledger blades in position substantially tangential to the fly blade, said spaced means being positioned with respect to the shear line to constantly urge the cloth radially inwardly of the fly blade towards the shear line, and a cloth rest on which the cloth travels to the shearing line of the shearing couple, said rest limiting the movement of the cloth radially inwardly of the fly blade towards the shear line while permitting relatively unlimited movement of the cloth radially outwardly away from the shear line.

4. In a machine for clipping loose threads on the face of a web of cloth, the combination with a shearing couple comprising a revoluble fly blade and associated ledger blade, of a perforated cloth support on which the face of the cloth to be sheared travels to the shear line of the fly blade and ledger blade in a position substantially tangent to the fly blade, and means for urging the face of the cloth into contact with the support while permitting movement of the cloth away from the support at the shear line.

5. In a machine for clipping loose threads on the face of a web of cloth, the combination with a shearing couple comprising a revoluble fly blade and associated ledger blade, of a plurality of relatively narrow spaced fingers extending towards the shear line and forming a support for the face of the cloth to be sheared as the latter travels towards the shear line, and means for urging the face of the cloth into contact with the fingers while permitting movement of the cloth away from the fingers at the shear line.

6. In a machine for clipping loose threads on the face of a web of cloth, the combination with a shearing couple comprising a revoluble fly blade and associated ledger blade, of a plurality of relatively narrow spaced fingers extending towards the shear lines and forming a support for the face of the cloth to be sheared as the latter travels towards the shear line, and means for creating a differential pressure on the opposite faces of the cloth to urge the cloth into contact with the fingers while permitting the cloth to move radially outwardly from the fingers at the shear line.

7. A seam protecting device for a cloth shearing machine comprising a shearing couple including stationary and relatively movable cooperating shearing members, a supporting grid having a series of relatively narrow parallel strips arranged to extend in the direction of travel of the cloth and on which the face of the cloth to be sheared rests, said supporting grid being curved in the direction of travel of the cloth with its concave side facing the shear line, and guiding means for said cloth spaced on either side of the shear line and adapted to hold the cloth against the convex external face of the grid while permitting movement of the cloth away from the grid at the shear line.

8. A seam protecting device for a cloth shearing machine comprising a shearing couple including stationary and relatively movable cooperating shearing members, a supporting grid having a series of relatively narrow parallel strips arranged to extend in the direction of travel of the cloth and on which the face of the cloth to be sheared is supported, said grid being curved in the direction of travel of the cloth with its convex face directed towards the shearing line, and means for holding the cloth in contact with the grid while permitting free movement of the cloth away from the grid at the shear line.

CHARLES G. RICHARDSON.